US011962213B2

(12) United States Patent
Jiao et al.

(10) Patent No.: US 11,962,213 B2
(45) Date of Patent: Apr. 16, 2024

(54) LINEAR MOTOR

(71) Applicant: GREE ELECTRIC APPLIANCES, INC. OF ZHUHAI, Zhuhai (CN)

(72) Inventors: Lei Jiao, Zhuhai (CN); Fang Xie, Zhuhai (CN); Xi Gao, Zhuhai (CN); Weijian Liu, Zhuhai (CN); Zhichao Zhang, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 423 days.

(21) Appl. No.: 17/241,076

(22) Filed: Apr. 27, 2021

(65) Prior Publication Data
US 2021/0249945 A1 Aug. 12, 2021

Related U.S. Application Data

(63) Continuation of application No. PCT/CN2019/104581, filed on Sep. 5, 2019.

(30) Foreign Application Priority Data

Dec. 4, 2018 (CN) .......................... 201811474619.0

(51) Int. Cl.
*H02K 41/03* (2006.01)
*H02K 1/17* (2006.01)
(Continued)

(52) U.S. Cl.
CPC ............. *H02K 41/031* (2013.01); *H02K 1/17* (2013.01); *H02K 1/34* (2013.01); *H02K 3/28* (2013.01); *H02K 3/46* (2013.01); *H02K 33/16* (2013.01)

(58) Field of Classification Search
CPC ............... H02K 41/031; H02K 41/033; H02K 41/0356; H02K 41/02; H02K 3/28;
(Continued)

(56) References Cited

U.S. PATENT DOCUMENTS

| 10,749,422 | B2 * | 8/2020 | Carbone ................ H02K 15/14 |
| 2011/0248579 | A1 | 10/2011 | Aoyama |
| 2015/0001969 | A1 | 1/2015 | Aoyama et al. |

FOREIGN PATENT DOCUMENTS

| CN | 203457013 U | 2/2014 |
| CN | 105356722 A | 2/2016 |

(Continued)

OTHER PUBLICATIONS

English translation FR2657201A1 (Year: 1990).*
European Patent Office, Office Action Issued in Application No. 19893657.7, Nov. 23, 2023, total 5 pages.

*Primary Examiner* — Nguyen Tran
(74) *Attorney, Agent, or Firm* — Kilpatrick Townsend & Stockton LLP

(57) ABSTRACT

Disclosed is a linear motor, including a mover and a stator which cooperate with each other. The mover includes mover iron cores arranged at intervals in a movement direction of the mover, and the stator includes permanent magnets arranged at intervals in the movement direction. Each of the mover iron cores includes an iron core yoke portion and an iron core tooth unit joined to each other. The iron core tooth unit defines an opening, and each of the permanent magnets is located at least partially within the opening.

17 Claims, 3 Drawing Sheets

(51) Int. Cl.
*H02K 1/34* (2006.01)
*H02K 3/28* (2006.01)
*H02K 3/46* (2006.01)
*H02K 33/16* (2006.01)

(58) Field of Classification Search
CPC .. H02K 3/04; H02K 3/46; H02K 3/16; H02K 3/48; H02K 3/493; H02K 1/17; H02K 1/16; H02K 1/12; H02K 1/34
See application file for complete search history.

(56) References Cited

FOREIGN PATENT DOCUMENTS

| | | |
|---|---|---|
| CN | 207732607 U | 8/2018 |
| CN | 109546838 A | 3/2019 |
| CN | 209419465 U | 9/2019 |
| FR | 2657201 A1 | 7/1991 |
| JP | H0739133 A | 2/1995 |
| WO | 2013047610 A1 | 4/2013 |
| WO | 2013186529 A2 | 12/2013 |

* cited by examiner

LINEAR MOTOR

CROSS REFERENCE TO RELATED APPLICATIONS

This application claims priority of Chinese Patent Application No. 201811474619.0, filed on Dec. 4, 2018, entitled "LINEAR MOTOR", the content of which is hereby incorporated by reference in its entirety. This application is a continuation under 35 U.S.C. § 120 of international patent application PCT/CN2019/104581, filed on Sep. 5, 2019, the content of which is also hereby incorporated by reference in its entirety.

FIELD

The present disclosure relates to the field of motor technologies, and more particularly relates to a linear motor.

BACKGROUND

Linear motors have the characteristics of high precision, high acceleration, high responsiveness, and high thrust, etc., and are widely used in the industrial field, especially in the direction of high-precision machining.

The linear motor in the related art includes permanent magnets and mover iron cores adjacent to the permanent magnets. Due to the unidirectional magnetic attraction between the mover iron cores and the permanent magnets, the mover needs to overcome the normal attraction of 5-10 times the thrust during the horizontal movement thereof, which results in unfavorable effects on the operation of the linear motor.

In order to overcome the normal attraction mentioned above, one of the improved methods in the related art is to make a reverse compensation by means of control algorithm to weaken the normal attraction. However, the performance of the motor may be reduced. Another improved method in the related art is to propose a two-side linear motor, in which the number of permanent magnets and the number of mover iron cores are both twice that of the one-side linear motor in the related art, and is implemented by means of the two-side linear motor, the magnetic attractions generated between the mover and permanent magnets at two sides respectively may be offset. However, the other method will cause the volume of the motor structure twice the original volume, which makes against the installation and usage of the motor.

In addition, the linear motor in the related art requires high installation accuracy between the mover iron cores and the permanent magnets, and the poor assembly may affect a magnetic field in the air gap therebetween, resulting in a deterioration of the motor performance.

SUMMARY

Embodiments of the present disclosure are to provide a linear motor to solve the problems that, for the linear motor in the related art, there is a unidirectional magnetic attraction between mover iron cores and permanent magnets, and a magnetic field in the air gap between the mover iron cores and the permanent magnets may be affected by poor assembly.

A linear motor includes a mover and a stator. The mover and the stator cooperate with each other. The mover includes mover iron cores arranged at intervals in a movement direction of the mover. The stator includes permanent magnets arranged at intervals in the movement direction. Each of the mover iron cores includes an iron core yoke portion and an iron core tooth unit joined to each other. The iron core tooth unit defines an opening, and each of the permanent magnets is located at least partially inside the opening.

According to the linear motor provided by the present disclosure, the mover iron core in the related art is improved by forming an opening thereon and arranging at least part of the permanent magnet in the opening, and the permanent magnet is located between the tooth portions on both sides of the opening, so that the magnetic attractions generated between the permanent magnet and the two tooth portions respectively are weakened or even offset, to improve the stability of the motor. In addition, since the permanent magnet is disposed between the tooth portions on both sides of the opening, a total magnetic flux can be ensured to be constant even though the permanent magnet and the iron core tooth unit are eccentrically assembled, so that a problem of deterioration of motor performance caused by poor assembly during production can be effectively avoided.

In some embodiments, the iron core tooth unit includes a first tooth portion and a second tooth portion. The first tooth portion and the second tooth portion are connected to two opposite ends of the iron core yoke portion, respectively, and the two opposite ends are arranged in a longitudinal length direction. The opening is defined between the first tooth portion and the second tooth portion.

In some embodiments, the first tooth portion and the second tooth portion are arranged symmetrically with respect to the iron core yoke portion.

In some embodiments, in the longitudinal length direction of the iron core yoke portion, a tooth width of the first tooth portion is equal to a tooth width of the second tooth portion.

In some embodiments, a first distance is defined between each permanent magnet and a corresponding first tooth portion, and a second distance is defined between each the permanent magnet and a corresponding second tooth portion.

In some embodiments, the first distance is equal to the second distance.

In some embodiments, a third distance is defined between each of the permanent magnets and a corresponding iron core yoke portion, and the third distance is greater than or equal to a sum of the first distance and the second distance.

In some embodiments, the linear motor further includes an iron core connection portion. In a longitudinal length direction of the iron core yoke portion, and the iron core tooth unit has two opposite sides. The two opposite sides of two adjacent iron core tooth units are connected by two iron core connection portions, respectively.

In some embodiments, a side wall of the iron core connection portion adjacent to the permanent magnet is aligned with the tooth unit of the mover iron core.

In some embodiments, in the longitudinal length direction of the iron core yoke portion, an outer side wall of the iron core tooth unit protrudes relative to a side wall of the iron core connection portion away from the permanent magnet, or, a side wall of the iron core connection portion away from the permanent magnet protrudes relative to an outer side wall of the iron core tooth unit.

In some embodiments, a winding is provided on the iron core yoke portion of each of the mover iron cores. s denotes a distance between two adjacent windings, $\tau$ denotes a distance between two adjacent permanent magnets, m denotes a number of slots of a primary part of the linear motor, and n denotes a number of poles of a secondary part of the linear motor, and $m \times s \leq n \times \tau$, and $m/n=0.1$ to 4.

In some embodiments, two adjacent permanent magnets are connected by a magnetic plate.

The embodiments of the above additional aspects will be described partially in the following description. Other part of the embodiments will become apparent from the following description or be appreciated by the implementation of the present disclosure.

DETAILED DESCRIPTION

Figure 1:
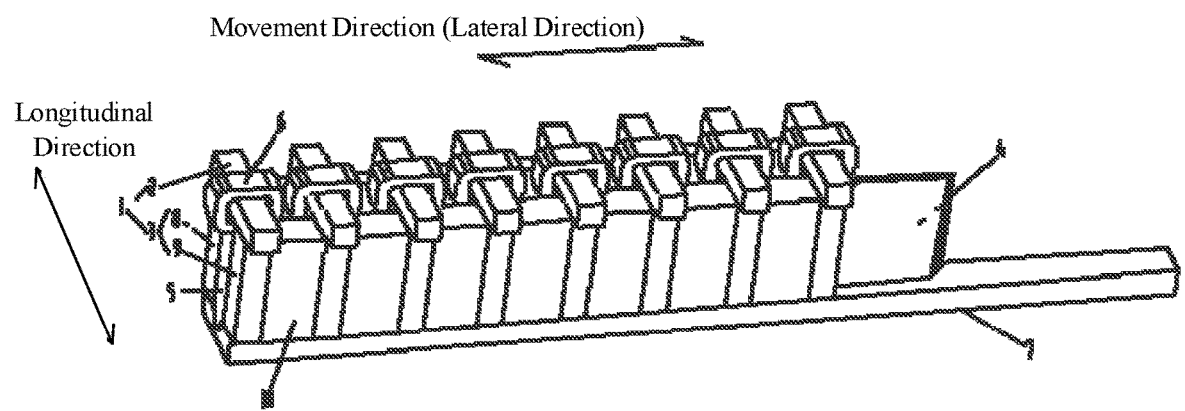
FIG. 1 is a first schematic structural view of a mover and a stator of a linear motor according to an embodiment of the present disclosure.

The principles and features of the present disclosure are described below with reference to the accompanying drawings, and various examples are provided for purposes of explaining the present disclosure only, but not intended to limit the scope of the present disclosure.

Referring to FIGS. 1 to 5, in an embodiment, a linear motor is provided, and includes a mover and a stator, which are cooperated with each other. The mover is arranged above the stator, and has a mounting clearance therebetween. The mover includes mover iron cores 1 arranged at intervals in a movement direction of the mover. The stator includes permanent magnets 4 arranged at intervals in the movement direction of the mover.

In the present embodiment, the mover iron cores 1 each are formed by punching transversely laminated "Π"-shaped silicon steel sheets. The mover iron cores 1 each include an iron core yoke portion 2 and an iron core tooth unit 3 joined to each other. In general, the iron core yoke portion 2 and the iron core tooth unit 3 are joined integrally. Each iron core yoke portion 2 is provided with a winding 6, and the winding 6 is winded around the iron core yoke portion 2. Each of the mover iron cores 1 and the winding 6 thereon form an armature winding set.

Figure 2:
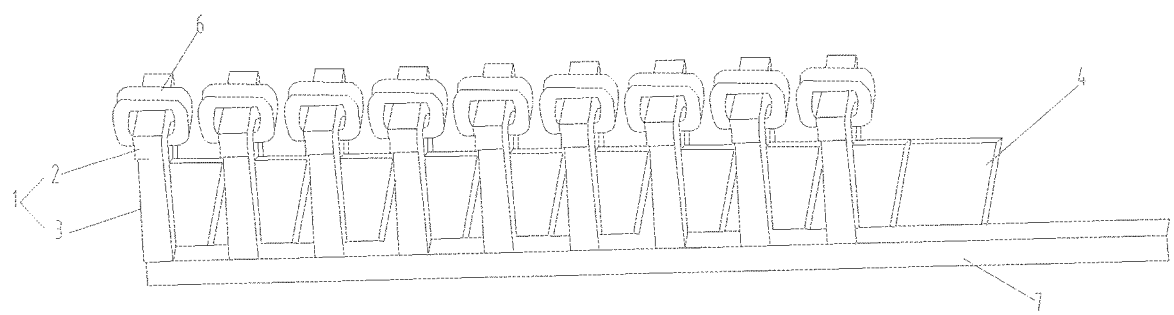
FIG. 2 is a second schematic structural view of the mover and the stator of the linear motor according to an embodiment of the present disclosure.
Figure 3:
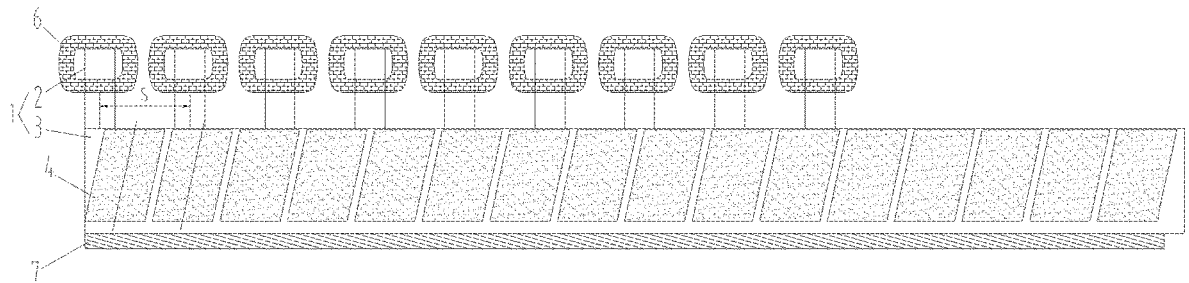
FIG. 3 is a schematic cross-sectional view of the mover and the stator of the linear motor according to an embodiment of the present disclosure.

In the present embodiment, two adjacent permanent magnets 4 are connected by a magnetic plate 7, as shown in FIGS. 1 to 3. The number of the magnetic plate 7 is one, and the permanent magnets 4 are fixed on the magnetic plate 7 by means of a substance such as a filler or glue, and arranged in a staggered manner in a lateral direction to provide a closed and longitudinal permanent magnetic field between openings 5. Of course, the number of the magnetic plate 7 is also plural, and two adjacent permanent magnets 4 are connected by one of the magnetic plates 7.

It should be noted that since the remaining parts except for the mover and the stator of the linear motor of the present embodiment are the same as those of the related art, the remaining parts of the motor except for the stator and the mover are not shown in the accompanying drawings.

One of the improvements of the linear motor having the mover iron cores 1 of the present embodiment are that: the iron core tooth unit 3 defines the opening 5 (also understood as a clearance), and each of the permanent magnets 4 is located at least partially inside the opening 5. In some embodiments, the opening 5 of the present embodiment is defined by a first tooth portion 8 and a second tooth portion 9 spaced at a preset interval. The first tooth portion 8 and the second tooth portion 9 are connected to two opposite ends of the iron core yoke portion 2, respectively, and the two opposite ends are arranged in a longitudinal length direction of the iron core yoke portion 2. It is also understood that the opening 5 divides the iron core tooth unit 3 into two separate tooth portions, that is, the first tooth portion 8 and the second tooth portion 9. Each of the permanent magnets 4 is at least partially disposed between the first tooth portion 8 and the second tooth portion 9, so that the magnetic attractions generated between the permanent magnet 4 and the two tooth portions respectively are weakened or even offset, to improve the stability of the motor. It should be noted that the above-mentioned "the longitudinal length direction" is a direction based on the directions or the positional relationships shown in the drawings, and is only for the purpose of describing the present disclosure and simplifying the description, but does not mean that the iron core yoke portion of the present disclosure necessarily have a longitudinal length in the direction.

Figure 5:
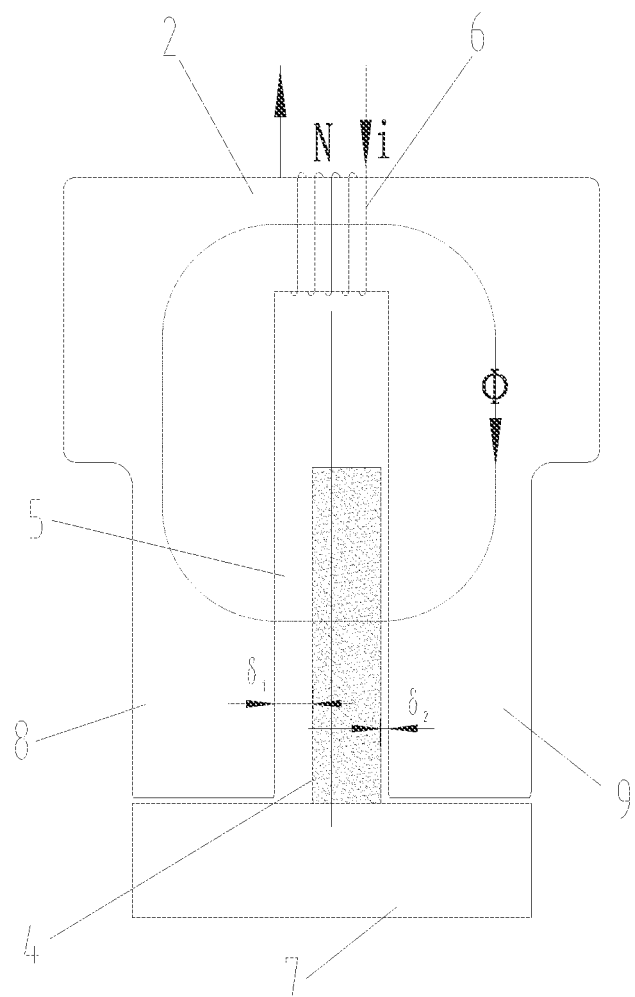
FIG. 5 is a second schematic assembly view of the mover iron cores and the permanent magnets of the linear motor according to an embodiment of the present disclosure.

As shown in FIG. 5, each of the permanent magnets 4 of the present embodiment is disposed between the first tooth portion 8 and the second tooth portion 9. A first distance between the permanent magnet 4 and the first tooth portion 8 is $\delta_1$, and a second distance between the permanent magnet 4 and the second tooth portion 9 is $\delta_2$, and an effective air gap $\delta=\delta_1+\delta_2$. The total magnetic flux generated by the motor is $$\phi = k\frac{N}{\delta} = k\frac{N}{\delta_1 + \delta_2}.$$

It is known that the total magnetic flux is ensured to be constant wherever the permanent magnet 4 is located between the first tooth portion 8 and the second tooth portion 9, thus effectively avoiding the problem of deterioration of the motor performance caused by the poor assembly during production.

Figure 4:
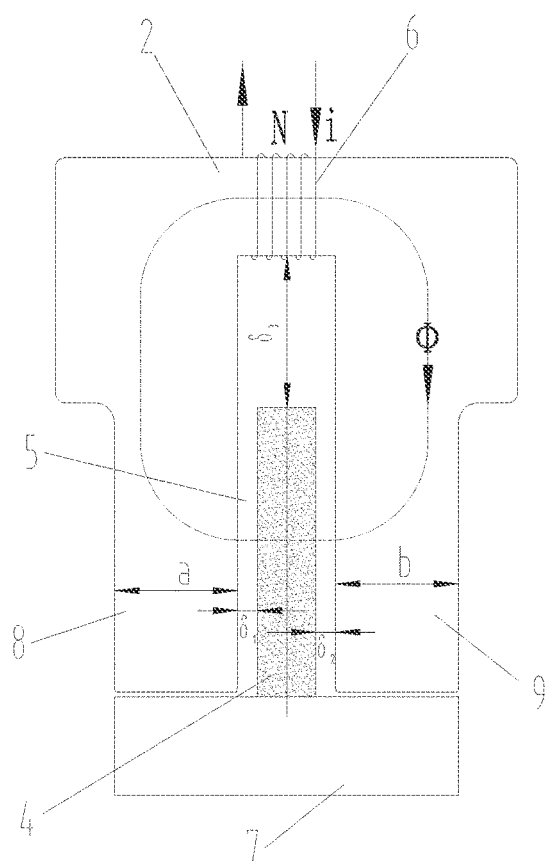
FIG. 4 is a first schematic assembly view of mover iron cores and permanent magnets of the linear motor according to an embodiment of the present disclosure.

As shown in FIG. 4, in some embodiments, the first tooth portion 8 and the second tooth portion 9 of the present embodiment are arranged symmetrically with respect to the center of the iron core yoke portion 2. In the longitudinal length direction of the iron core yoke portion 2, a tooth width of the first tooth portion 8 is equal to a tooth width of the second tooth portion 9. The first distance $\delta_1$ between the permanent magnet 4 and the first tooth portion 8 is equal to the second distance $\delta_2$ between the permanent magnet 4 and the second tooth portion 9.

In such a structure, F1 denotes the normal magnetic attraction of the permanent magnet 4 applied to the first tooth portion 8, and F2 denotes the normal magnetic attraction thereof applied to the second tooth portion 9. The tooth width of the first tooth portion 8 is equal to the tooth width of the second tooth portion 9, and $\delta_1=\delta_2$, therefore the magnetic attractions of the permanent magnet 4 applied to the first tooth portion 8 and the second tooth portion 9 on both sides respectively are equal (namely F1=F2). However the directions of the magnetic attractions are opposite, therefore, the normal magnetic attractions of the permanent magnet 4 applied to the mover iron core are offset.

On the basis of the above-mentioned structure, the third distance between the permanent magnet 4 and the iron core yoke portion 2 of the present embodiment is $\delta_3$. In order to guarantee that the permanent magnet 4 generates a closed magnetic circuit at the mover iron core side, the direction of the magnetic field generated by each of the permanent magnets 4 is a longitudinal direction perpendicular to the lateral direction. The magnetic field generated by the permanent magnet 4 circuits the first tooth portion 8, the iron core yoke portion 2, and the second tooth portion 9, and arrives at another side of the permanent magnet 4. In the present embodiment, $\delta_1+\delta_2 \le \delta_3$.

In addition, the applicant has found that, there is no connection relationship between the tooth units of two adjacent mover iron cores in the related art, and the two adjacent tooth units are disconnected, resulting in an uneven magnetic field inside the air gap, and thus positioning accuracy is low.

Therefore, the linear motor of the present embodiment is further provided with an iron core connection portion 10 configured to connect two adjacent mover iron cores 1. The iron core connection portion 10 is a metal plate-shaped member, as shown in FIG. 1. In the length direction of the iron core yoke portion 2, the iron core tooth unit 3 has two opposite sides, and the two opposite sides of two adjacent iron core tooth units 3 are connected by two iron core connection portions 10, respectively. That is, in two adjacent iron core tooth units 3, a first side of a first iron core tooth unit 3 is connected to a first side of a second iron core tooth unit 3 by a first iron core connection portion 10, whereas a second side of the first iron core tooth unit 3 is connected to a second side of the second iron core tooth unit 3 by a second iron core connection portion 10. The plurality of mover iron cores 1 and the iron core connection portions 10 therebetween form a channel-shaped structure, which can address the problem of uneven magnetic field in the air gap and improve the positioning accuracy.

In an embodiment, a side wall (i.e., an inner side wall) of the iron core connection portion 10 adjacent to the permanent magnet 4 is aligned with the tooth unit of the mover iron core 1, to guarantee the consistency of the air gap in the lateral movement direction, so that the magnetic co-energy in the air gap between the permanent magnet 4 and the tooth unit of the armature winding set is not changed due to a lateral movement. In some embodiments, as shown in FIG. 4, in such a structure, after a metal connection plate having the same height as the tooth unit is provided between the tooth units of two armature winding sets to form an iron core connection portion, the magnetic flux line 0 in the air gap between the mover iron core 1 and the permanent magnet 4 substantially forms a saddle shape or a rectangle as shown in FIG. 4, so that the magnetic density in the air gap is substantially constant in the lateral movement direction, which effectively solves the problem that the air density in the air gap changes when the mover iron core 1 move relative to the permanent magnet 4 during the operation of the linear motor, and also solves the problem that the magnetic co-energy in the air gap changes, to improve the magnetic resistance and thrust fluctuation during the operation of the motor, and achieving the effects of reducing the thrust fluctuation of the linear motor and improving the positioning accuracy.

Furthermore, in the present embodiment, the iron core connection portion, and the iron core tooth unit 3 are configured as: in the length direction of the iron core yoke portion 2, an outer side wall of the iron core tooth unit 3 protrudes relative to a side wall of the iron core connection portion 10 away from the permanent magnet 4, or the side wall of the iron core connection portion 10 away from the permanent magnet 4 protrudes relative to the outer side wall of the iron core tooth unit 3. That is, a longitudinal width of the iron core connection portion is greater or smaller than a longitudinal width of a "Π"-shaped iron core tooth unit 3. When armature winding sets are assembled together along the lateral structure and filled with non-magnetic-conductive epoxy resin or injection molding material, a boss positioning is formed between each armature winding set and the iron core connection portion, which not only facilitates fixing the tooling mold for the mover, but also is beneficial to enhancement of the structural strength between the armature winding sets and the iron core connection portion.

In addition, in order to guarantee a continuous and stable operation of the linear motor having such structure in the lateral direction, in the linear motor of some embodiments, further improvements are made in a distance between two adjacent windings 6 and a distance between two adjacent permanent magnets 4, and the plurality of mover iron cores 1 are spaced at uniform intervals, so that both the distance between two adjacent windings 6 and the distance between two adjacent permanent magnets 4 are constant. s denotes the distance between two adjacent windings 6, τ denotes the distance between two adjacent permanent magnets 4, m×s≤n×τ, where m/n=0.1 to 4. In some embodiments, m/n=0.5 to 3, where m denotes a number of slots of a primary part of the linear motor, n denotes a number of poles of a secondary part of the linear motor, and the number m of the slots is determined by the specific structure and the number of phases of the motor.

In the description of the present disclosure, it should be understood that the terms "upper", "lower", "left", "right", "inner", "outer", "horizontal" and the like for indicating a direction or positional relationship are based on the direction or positional relationship shown in the accompanying drawings, and are merely intended to facilitate the description of the present disclosure and simplify the description, but not intended to indicate or imply that a device must have such specific direction, be constructed and operated in such specific location, therefore these terms should not be explained as a limitation of the present disclosure.

Furthermore, the terms "first", "second" and the like are used for descriptive purposes only, and shall not be understood as indicating or implying relative importance or implicitly indicating the number of embodiments indicated. Thus, the features defined with "first", "second" and the like can explicitly or implicitly include one or more such features. In the description of the present disclosure, unless otherwise specified, the term "a plurality" means more than two.

In the present disclosure, unless otherwise specified and limited, the terms "install", "connect with", "connect to" and the like should be interpreted broadly. For example, these terms may be "fixedly connect to", "detachably connect to", "integrate with" or the like. The specific meaning of the above-mentioned terms in the present disclosure can be understood according to the specific situation.

Although the embodiments of the present disclosure have been shown and described above, it should be understood that the embodiments described above are exemplary and not intended to limit the present disclosure. Amendments, replacements, and modifications to the embodiments described above within the scope of the present disclosure.

What is claimed is:

1. A linear motor, comprising a mover and a stator, wherein:
the mover and the stator cooperate with each other;
the mover comprises a plurality of mover iron cores arranged at intervals in a movement direction of the mover;
the stator comprises a plurality of permanent magnets arranged at intervals in the movement direction;
each of the mover iron cores comprises an iron core yoke portion and an iron core tooth unit joined to each other; the iron core tooth unit defines an opening; and each of the permanent magnets is located at least partially inside the opening;
the linear motor further comprises an iron core connection portion; in a longitudinal length direction of the iron core yoke portion, the iron core tooth unit has two opposite sides; and the two opposite sides of two adjacent iron core tooth units are connected by two iron core connection portions, respectively; and
a metal connection plate having a same height as the tooth unit is provided between the tooth units of two armature winding sets to form the tooth iron core connection portion.

2. The linear motor according to claim 1, wherein the iron core tooth unit comprises a first tooth portion and a second tooth portion; the first tooth portion and the second tooth portion are connected to two opposite ends of the iron core yoke portion, respectively, and the two opposite ends are arranged in a longitudinal length direction; and the opening is defined between the first tooth portion and the second tooth portion.

3. The linear motor according to claim 2, wherein the first tooth portion and the second tooth portion are arranged symmetrically with respect to the iron core yoke portion.

4. The linear motor according to claim 3, wherein in the longitudinal length direction of the iron core yoke portion, a tooth width of the first tooth portion is equal to a tooth width of the second tooth portion.

5. The linear motor according to claim 2, wherein a first distance is defined between each permanent magnet and a corresponding first tooth portion, and a second distance is defined between each the permanent magnet and a corresponding second tooth portion.

6. The linear motor according to claim 5, wherein the first distance is equal to the second distance.

7. The linear motor according to claim 5, wherein a third distance is defined between each of the permanent magnets and a corresponding iron core yoke portion; and the third distance is greater than or equal to a sum of the first distance and the second distance.

8. The linear motor according to claim 1, wherein a side wall of the iron core connection portion adjacent to the permanent magnet is aligned with the tooth unit of the mover iron core.

9. The linear motor according to claim 1, wherein in the longitudinal length direction of the iron core yoke portion, an outer side wall of the iron core tooth unit protrudes relative to a side wall of the iron core connection portion away from the permanent magnet, or, a side wall of the iron core connection portion away from the permanent magnet protrudes relative to an outer side wall of the iron core tooth unit.

10. The linear motor according to claim 1, wherein a winding is provided on the iron core yoke portion of each of the mover iron cores; s denotes a distance between two adjacent windings, r denotes a distance between two adjacent permanent magnets, m denotes a number of slots of a primary part of the linear motor, and n denotes a number of poles of a secondary part of the linear motor, wherein $m \times s \leq n \times \tau$, and $m/n = 0.1$ to 4.

11. The linear motor according to claim 1, wherein two adjacent permanent magnets are connected by a magnetic plate.

12. The magnetic plate according to claim 11, wherein a number of the magnetic plate is plural, and two adjacent permanent magnets are connected by one of the magnetic plates.

13. The linear motor according to claim 1, wherein a side wall of the iron core connection portion adjacent to the permanent magnets is aligned with at least part of surfaces of the iron core tooth unit.

14. The linear motor according to claim 1, wherein the mover is arranged above the stator, and there is a certain mounting clearance therebetween.

15. The linear motor according to claim 1, wherein the iron core connection portion is a metal plate-shaped member.

16. The linear motor according to claim 1, wherein the plurality of mover iron cores are spaced at uniform intervals.

17. The linear motor according to claim 10, wherein, $m/n = 0.5$ to 3.

* * * * *